US008573616B2

(12) United States Patent  (10) Patent No.: US 8,573,616 B2
Iversen  (45) Date of Patent: Nov. 5, 2013

(54) SUSPENSION SYSTEM WITH INCLINATION STABILIZATION

(75) Inventor: Thorkil K Iversen, Stovring (DK)

(73) Assignee: Hydema Produktion A/S, Stovring (DK)

(*) Notice: Subject to any disclaimer, the term of this patent is extended or adjusted under 35 U.S.C. 154(b) by 161 days.

(21) Appl. No.: 13/263,913

(22) PCT Filed: May 12, 2010

(86) PCT No.: PCT/DK2010/000063
§ 371 (c)(1),
(2), (4) Date: Oct. 11, 2011

(87) PCT Pub. No.: WO2010/136032
PCT Pub. Date: Dec. 2, 2010

(65) Prior Publication Data
US 2012/0068430 A1  Mar. 22, 2012

(30) Foreign Application Priority Data

May 29, 2009 (DK) ................................. 2009 00673
Jul. 13, 2009 (DK) ................................. 2009 00856

(51) Int. Cl.
B60G 9/02 (2006.01)
(52) U.S. Cl.
USPC ........ 280/124.11; 280/124.106; 280/124.112; 180/358
(58) Field of Classification Search
USPC ........ 280/124.106, 124.11, 124.111, 280/124.112, 124.114, 124.116, 124.117; 180/349–356, 358
See application file for complete search history.

(56) References Cited

U.S. PATENT DOCUMENTS 712,196 A * 10/1902 Lane et al. ............... 180/351
995,155 A * 6/1911 Koeb et al. .............. 180/353
1,046,388 A * 12/1912 Hill ......................... 180/354

(Continued)

FOREIGN PATENT DOCUMENTS

| EP | 09832512 B1 | 8/1999 |
| EP | 1226985 A1 | 7/2002 |
| EP | 1302342 A2 | 4/2003 |
| EP | 1527912 A1 | 10/2011 |

OTHER PUBLICATIONS

International Search Report for PCT/DK2010/00063, Mailed Aug. 16, 2010, 2 pages.

Primary Examiner — Drew Brown
Assistant Examiner — Barry Gooden, Jr.
(74) Attorney, Agent, or Firm — William J. Sapone; Ware Fressola; Maguire & Barber LLP

(57) ABSTRACT

A suspension system with inclination stabilization, in particular for use on heavy work vehicles, such as a dumper, where the front pair of wheels is mounted on a transverse rigid axle, has an axle (5) firmly connected with a Y-shaped frame (1) extending in the longitudinal direction along the central line (M) of the vehicle. The frame is suspended from the chassis of the vehicle, partly from a spherical bearing (4) disposed in the central line of the vehicle, partly via two spring units (2, 3) arranged symmetrically around the central line and a rod connection (7). The frame is additionally equipped with one or more laterally directed stabilization arms (6) which are confined by the chassis. This provides a suspension system which contains a very small number of components, which is stable, sturdy and resistant to wear, and which contains both springing, level adjustment and inclination stabilization.

7 Claims, 2 Drawing Sheets

(56) References Cited

U.S. PATENT DOCUMENTS

| | | | |
|---|---|---|---|
| 1,133,813 A * | 3/1915 | Marmon | 180/346 |
| 1,430,833 A * | 10/1922 | Nacker | 180/349 |
| 1,454,115 A * | 5/1923 | Holden | 180/349 |
| 1,479,187 A * | 1/1924 | Lansden | 180/349 |
| 1,937,653 A * | 12/1933 | Haltenberger | 180/358 |
| 2,209,457 A * | 7/1940 | Hare | 180/56 |
| 2,369,501 A * | 2/1945 | Wagner et al. | 180/352 |
| 2,692,778 A * | 10/1954 | Stump | 280/124.106 |
| 2,746,766 A * | 5/1956 | Nallinger | 280/124.179 |
| 2,814,352 A * | 11/1957 | Muller | 180/295 |
| 3,744,813 A * | 7/1973 | Magleave et al. | 280/124.109 |
| 3,844,579 A * | 10/1974 | Cunha | 280/86.75 |
| 4,415,179 A * | 11/1983 | Marinelli | 280/124.116 |
| 4,909,534 A * | 3/1990 | Fukushima et al. | 280/5.514 |
| 4,946,189 A * | 8/1990 | Manning | 180/349 |
| 5,054,575 A * | 10/1991 | Collins | 180/354 |
| 5,366,035 A * | 11/1994 | Hayashida et al. | 180/24.01 |
| 5,649,719 A * | 7/1997 | Wallace et al. | 280/124.156 |
| 5,879,016 A * | 3/1999 | Altherr et al. | 280/124.112 |
| 6,454,294 B1 * | 9/2002 | Bittner et al. | 280/677 |
| 6,935,453 B2 * | 8/2005 | Mizuta et al. | 180/235 |
| 7,029,059 B2 * | 4/2006 | Bernhardt et al. | 296/190.07 |
| 7,518,068 B2 * | 4/2009 | Green | 177/25.13 |
| 2008/0257571 A1 * | 10/2008 | Keane et al. | 172/21 |
| 2009/0115153 A1 * | 5/2009 | Guhman | 280/124.11 |

\* cited by examiner

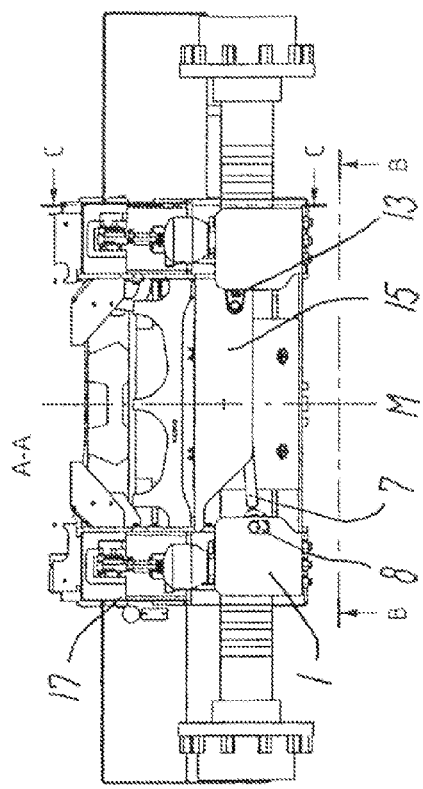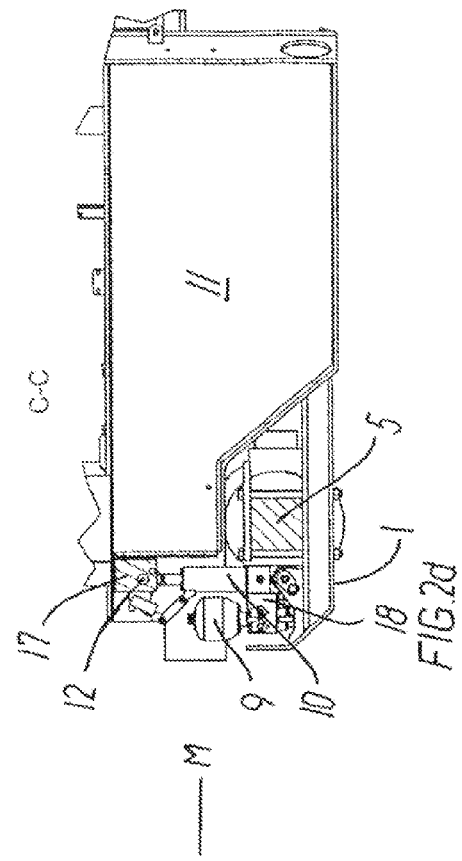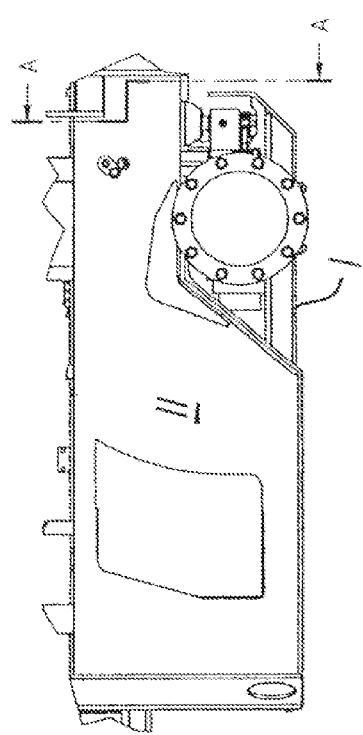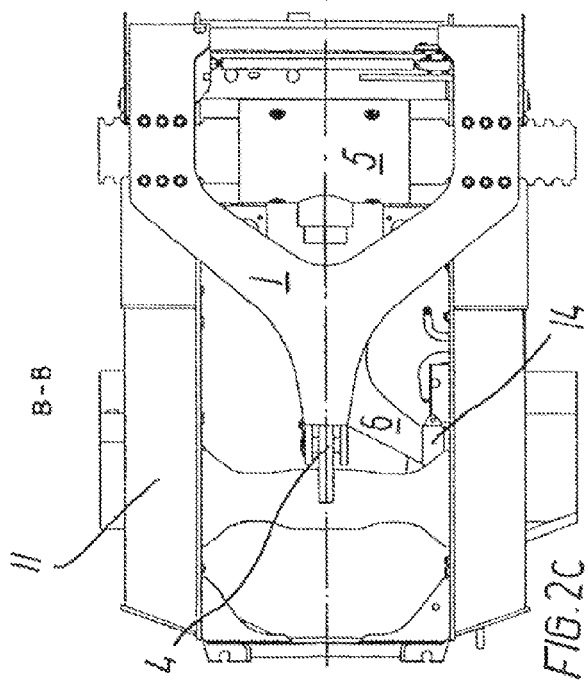
FIG. 2a
FIG. 2b
FIG. 2c
FIG. 2d

SUSPENSION SYSTEM WITH INCLINATION STABILIZATION

TECHNICAL FIELD

The present invention relates to a suspension system with inclination stabilization, in particular for heavy work vehicles, such as a dumper, where the front pair of wheels is mounted on a transverse driving rigid axle.

BACKGROUND

The Patent Specification DK 176690 B1 discloses a suspension system, in particular for heavy work vehicles, which comprises a rigid front axle suspended from parallel, pivotable rods and from a triangular rod connection. The suspension system is capable of absorbing most of the occurring impacts from the wheels, so that these impacts are only transferred to the vehicle to a minor degree.

One of the drawbacks of this structure is that the system contains many movable parts and bearings which are subjected to wear, and that the free mobility of the system is limited by the mounting principle and the patterns of movement of the rod connections.

The document EP 0 932 512 B1 discloses a pendular spring mounted axle suspension where the relative movement of the axle and the chassis is limited by a pair of mechanical stops, which protrude vertically from the upper side of the axle on both sides and another pair of mechanical stops, pointing downwards from the chassis. The maximum angle between the axle and the chassis is limited to 11 degrees.

THE OBJECT OF THE INVENTION

It is the object of the invention to provide a suspension system of the type mentioned in the opening paragraph, which contains a very small number of components, which is stable, sturdy and resistant to wear, and which contains both springing, level adjustment and inclination stabilization.

The object stated above is achieved according to the invention in that a driving axle is firmly connected with a Y-shaped frame extending along a central line (M), and that the frame (1) is suspended from a chassis (11), partly from a spherical bearing (4) disposed in the central line (M) of the chassis, partly via two spring units (2, 3) arranged symmetrically around the central line and a rod connection (7), and that the frame is additionally equipped with one or more stabilization arms (6) which are equipped with elastic means (14) on the upper and lower sides, said elastic means comprising a rubber buffer or a hydraulic cylinder.

This provides a three-point suspension, thereby ensuring that the Y-frame with the rigid axle may be moved freely up and down, and that, simultaneously, it may perform a transverse tilting movement in the spherical bearing around the central line.

The rod connection is a so-called Panhard rod and serves the purpose of absorbing lateral loads during e.g. cornering.

When the stabilization arms are equipped with an elastic means on the upper and lower sides, said elastic means comprising a rubber buffer or a hydraulic cylinder, it is ensured that the inclination deflection may be damped and/or controlled.

When the stabilization arms are laterally directed and in loose engagement with the chassis, where the arm is confined by the chassis, thereby ensuring that the inclination deflection between the Y-frame and the chassis is limited.

When the stabilization arms are simultaneously directed outwards toward both sides of the chassis, it is ensured that the confinement forces and thereby the load on the stabilization arms are distributed.

When the spring units are hydraulic and comprise an accumulator and a cylinder, and each of the cylinders is equipped with a sensor for measuring the length of the cylinder, an efficient and sturdy suspension is achieved, which may be level-adjusted.

BRIEF DESCRIPTION OF THE DRAWINGS

Exemplary embodiments of the invention will be explained more fully below with reference to the drawing, in which:

FIG. 2a shows in a lateral view how the suspension system is incorporated in the chassis;

FIG. 2b shows a sectional view A-A of the chassis seen from the front, it being shown how the spring units are coupled to the chassis;

FIG. 2c shows the projection B-B with the chassis and the suspension system seen from below with the spherical bearing connection between the Y-frame and the chassis; and, FIG. 2d shows a section C-C in a lateral view of the chassis, it being shown how the spring units are coupled to the chassis.

DETAILED DESCRIPTION OF THE INVENTION

Figure 1:
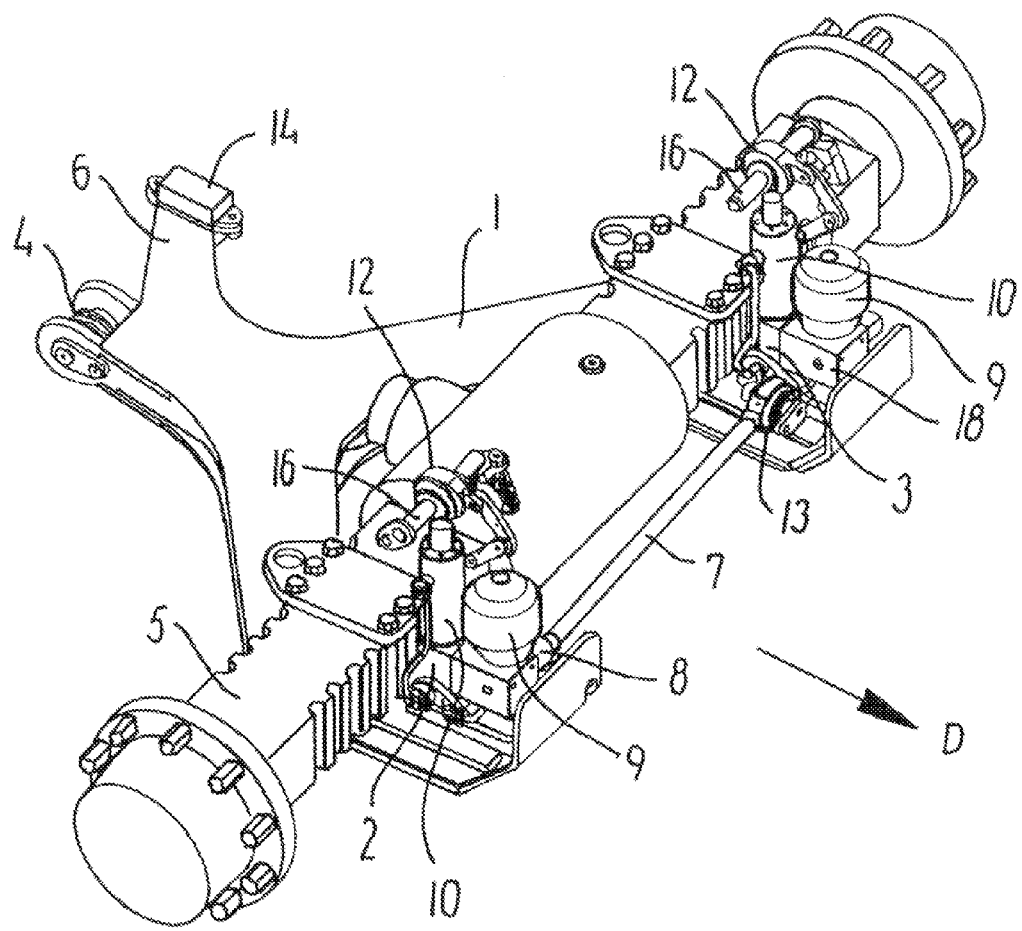
FIG. 1 shows the suspension according to the invention seen in perspective.

The example comprises a suspension system with inclination stabilization and level adjustment for a heavy work vehicle with a rigid front axle.

FIG. 1 is a perspective view of the suspension system according to the invention, indicating a direction of forward travel by the arrow D. A rigid transverse drive axle 5 and two spring units 2, 3 are firmly mounted on the front part of a Y-shaped frame 1. Further, a Panhard rod 7 is mounted in a bearing mount 8. The rear part of the Y-frame is equipped with a spherical bearing 4 as well as a laterally directed stabilization arm 6.

The FIGS. 1 and 2a-2d shows in general that each of the spring units comprises a hydraulic accumulator 9 and a hydraulic cylinder 10. The accumulator and the cylinder together constitute the springing element of the system. A valve block 18 is inserted between the cylinder 10 and the accumulator 9, said valve block being equipped with a check throttle slide valve, which allows free flow to the accumulator when the cylinder is compressed, and throttles the back flow when the cylinder is extended, so that the movements of the Y-frame are damped.

The cylinders are connected with the chassis 11 at the bearings 12, which are secured to the side members 17 of the chassis via the shafts 16. Each of the spring elements is equipped with a sensor (not shown) which measures how far the cylinder has been extended.

The Panhard rod 7 is additionally connected with the chassis at the bearing 13, which is arranged on the radiator bracket 15 and is capable of absorbing lateral loads during cornering.

The Y-frame is equipped with a laterally directed stabilization arm 6, which arm may be directed to the one or the other side. This arm is in engagement with the chassis 11, so that the movements of arm are confined by the chassis, whereby the inclination of the Y-frame is limited relative to the chassis.

The Y-frame may additionally be equipped with stabilization arms directed toward both sides of the frame. Hereby, confinements may be established on both sides of the chassis, and the load may thereby be distributed on two stabilization arms.

Moreover, the stabilization arm is equipped with an elastic means 14 which is disposed on the upper and lower sides of the arm, and which contributes to damping or controlling the inclination deflection. The elastic means may be formed by a simple rubber buffer, but may also be formed by a hydraulic cylinder for controlling the inclination.

The spherical bearing 4 constitutes the connection between the Y-frame 1 and the chassis 11. Since the bearing is spherical, the Y-frame may pivot freely up or down and, at the same time, perform transverse tilting movements around the centre line relative to the chassis. The movements and deflections of the Y-frame, however, are controlled by the stabilization arm and by the spring units.

The spring units 2, 3 may adjust the positions of the wheel relative to the chassis independently of each other by the sensing of sensors, which measure how far the cylinders 10 have been extended, so that the chassis is kept in a horizontal position. The spring units also adjust the general level of the chassis above the ground, so that the Y-frame is capable of working relative to occurring bumpiness of the ground.

The system is both stable, sturdy and resistant to wear and moreover contains only a few components, which makes it particularly suitable for heavy vehicles, but, of course, it may also be adapted to smaller vehicles to the same advantage.

The invention claimed is:

1. A suspension system with inclination stabilization, in particular for heavy work vehicles, where a front pair of wheels is mounted on a transverse driving rigid axle, the suspension system comprising:
the driving axle (5) firmly connected with a Y-shaped frame (1) at a front part of the Y-shaped frame consisting of two legs which extend from a rear part of the Y-shaped frame, the driving axle firmly connected along a central line (M), the Y-shaped frame (1) being suspended from a chassis (11), partly at the rear part of the Y-shaped frame by a spherical bearing (4) disposed in the central line (M) of the chassis, partly via two spring units (2, 3) arranged on the two legs of the Y-shaped frame symmetrically around the central line and a rod connection (7), the rear part of the Y-shaped frame being additionally equipped with one or more stabilization arms (6), configured to limit inclination movements of the Y-shaped frame supporting the driving axle, the one or more stabilization arms being equipped with elastic means (14) located on upper and lower sides of the one of more stabilization arms said elastic means being a rubber buffer or a hydraulic cylinder.

2. The suspension system according to claim 1 wherein the one or more stabilization arms (6) are simultaneously directed outwards toward both sides of the chassis (11).

3. The suspension system according to claim 1, wherein the two spring units (2, 3) adjust a level of the chassis above the ground.

4. The suspension system according to claim 1, wherein the one or more stabilization arms (6) are laterally directed and in loose engagement with the chassis (11).

5. The suspension system according to claim 4 wherein the one or more stabilization arms (6) are simultaneously directed outwards toward both sides of the chassis (11).

6. The suspension system according to claim 1, wherein the two spring units (2, 3) are hydraulic and comprise an accumulator (9) and a cylinder (10), and that each of the two spring units (2, 3) is equipped with a sensor for measuring a length of the cylinder.

7. The suspension system according to claim 6, wherein the two spring units (2, 3) adjust a level of the chassis above the ground.

* * * * *